Figure 1:
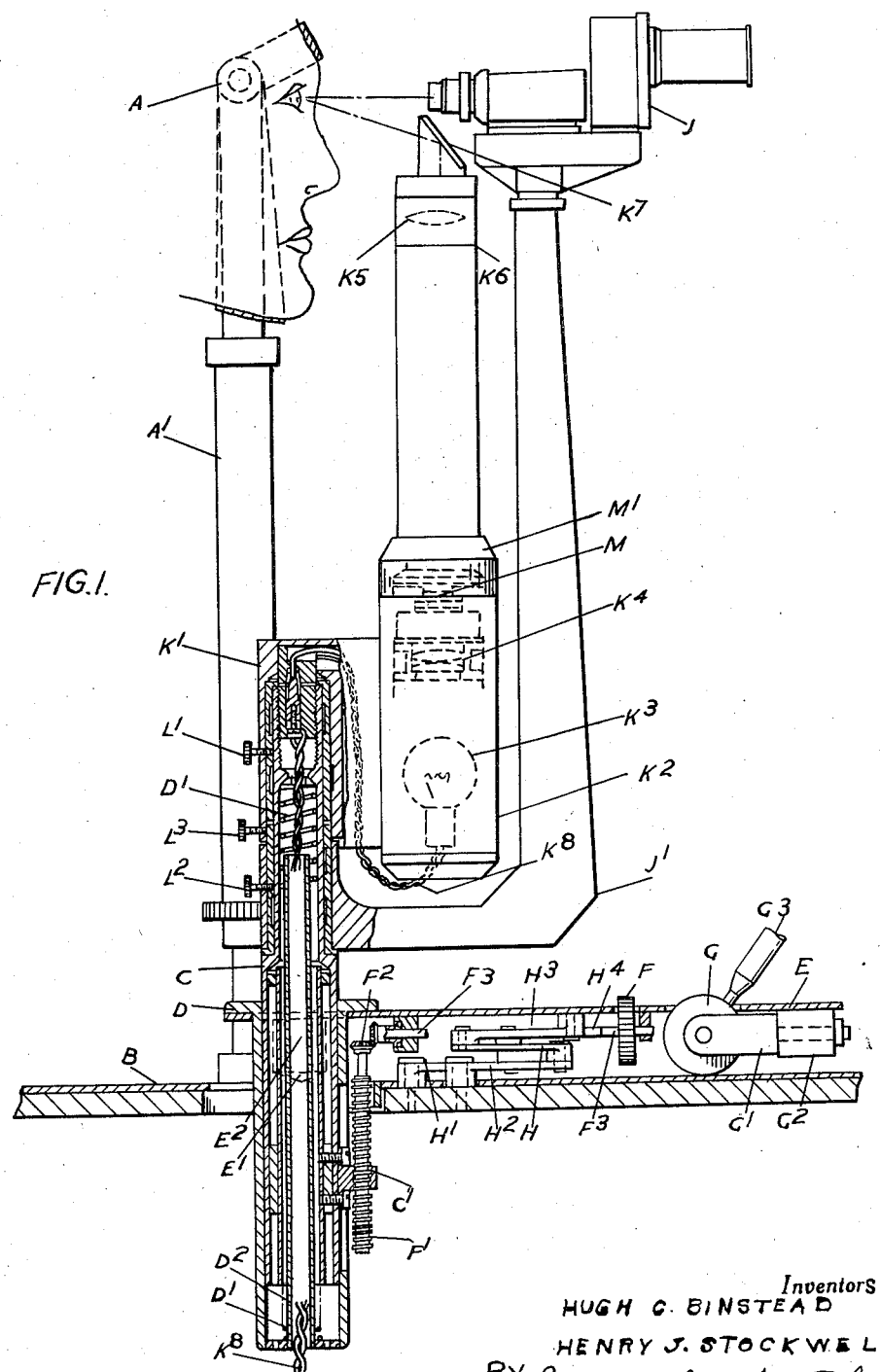

Inventors
HUGH C. BINSTEAD
HENRY J. STOCKWELL
By Emery Holcombe & Blair
Attorneys June 10, 1958    H. C. BINSTEAD ET AL    2,837,963
OPTICAL APPARATUS FOR THE EXAMINATION OF THE HUMAN EYE
Filed Jan. 23, 1950    2 Sheets-Sheet 2
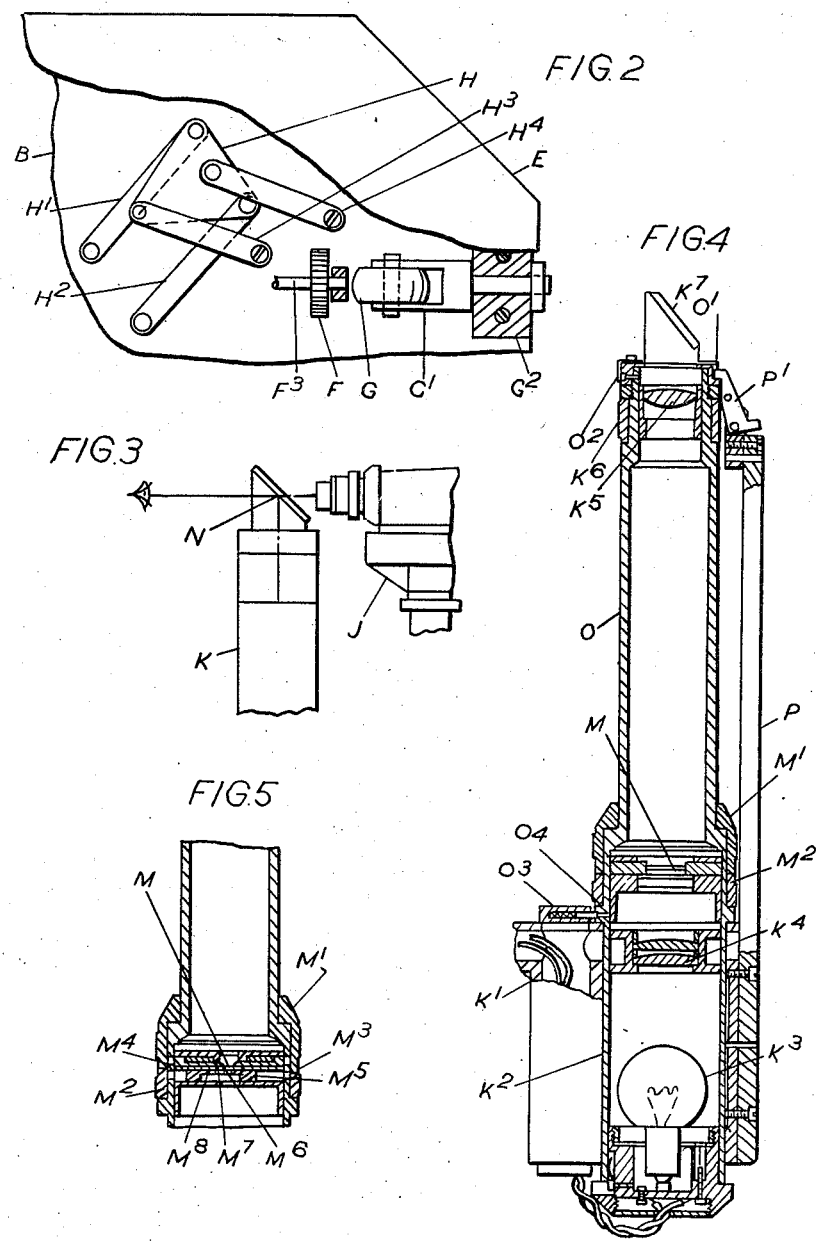
Inventors
HUGH C. BINSTEAD
HENRY J. STOCKWELL
BY Emery Holcombe & Blair
Attorneys United States Patent Office 2,837,963
Patented June 10, 1958

2,837,963

OPTICAL APPARATUS FOR THE EXAMINATION OF THE HUMAN EYE

Hugh Cecil Binstead, Hastingwood, near Harlow, and Henry James Stockwell, Kenton, England, assignors to Allied Instrument Manufacturers Limited, London, England, a company of Great Britain Application January 23, 1950, Serial No. 140,104

Claims priority, application Great Britain January 25, 1949

16 Claims. (Cl. 88—20)

This invention relates to optical apparatus for the examination of the human eye, of the kind commonly known as a "slit lamp" apparatus comprising a microscope which can be swung round to enable the eye to be examined from different angles and illuminating means for focussing a beam of light on to a chosen part of the eye, such illuminating means also being so mounted that it can be swung round to illuminate the eye from different angles. In known apparatus of this kind, a serious practical difficulty arises in that the illuminating means and the microscope lie in each other's path of movement and one of them must be moved out of the way temporarily whenever one has to be swung past the other, so that there is a relatively wide minimum angle between the directions of illumination and of viewing within which it is not possible to carry out the examination. It has been proposed to provide a prism or system of mirrors which can be interposed in the path of the illuminating rays in order to enable this useless angle to be reduced, but even then there still remains the difficulty that the microscope and the illuminating means cannot be swung past each other without temporarily moving one of them out of the way.

The present invention has for its object to provide improved slit lamp apparatus, wherein the obstruction by the illuminating means and the microscope to each other's movements is eliminated.

The apparatus according to the invention comprises a head rest for locating the eye to be examined at the object position, a microscope for observing the object position mounted on a bracket rotatable about an axis approximately aligned on the object position the optical axis of the microscope being approximately at right angles to such axis of rotation, and means for illuminating the object position also rotatable about such axis of rotation and including an aperture, a source of light for illuminating the aperture and an objective for focussing an image of the aperture on the object position, the optical axis of such objective being approximately parallel to the axis of rotation and the illuminating beam from the objective being deflected to the object position by a small reflector which lies close to but just clear of the path of movement of the microscope.

It will be appreciated that, with this arrangement, the main body of the illuminating means, including its objective, is well out of the way of the microscope, and that the only part thereof which comes close to the microscope is the reflector which owing to its small size can be accommodated quite close to the objective end of the microscope without fouling the movement thereof or the path of the rays from the object position to the microscope. The narrow illuminating pencil of rays will thus approach the object position at only a small inclination to the plane traced out by the optical axis of the microscope as it is swung round. If the clearance between the microscope and the patient's face is sufficient, the small reflector may, if desired, be made partially transparent and may intercept the optical axis of the microscope (or the plane of movement thereof) so as to permit the axis of the illuminating pencil to be made coincident with the optical axis of the microscope if required.

The microscope bracket and the illuminating means can be swung independently round the axis of rotation, but it will usually be convenient to provide means for locking them to one another to enable them to be swung together as a unit, when desired.

In a modified construction an aperture of narrow slit form is employed, the source of light being set relatively to the slit to give maximum illumination throughout the length of the slit. Means may be provided whereby the aperture and source of light can be rotated about the axis of the illuminating device. Preferably, means are provided whereby the small reflector can either be rotated with the aperture or be held against rotation whilst the aperture is rotated. If desired a detent is provided for holding the aperture in one or more preferred positions.

The invention may be carried into practice in various ways, but some convenient arrangements according to the invention are shown diagrammatically and by way of example in the accompanying drawings, in which Figure 1 is a side elevational view of one arrangement with parts broken away to show the method of mounting and adjusting the apparatus, Figure 2 is a plan view of a portion of the platform of the apparatus also with parts broken away, Figure 3 is a side elevational view of a portion of the illuminating member and the viewing microscope to show an alternative construction, Figure 4 is a side elevational view of an alternative type of illuminating member with parts shown in section, and Figure 5 is a sectional view taken at right angles to the view of Figure 4.

In the construction shown in Figure 1 the head rest A is carried by two supports $A^1$, only one of which is shown, such supports being attached at their lower ends to the instrument table B. The eye of the patient is thus located in the object position of the apparatus. This position is above and approximately on the axis of the spindle C which can be moved vertically relative to the sleeve D mounted on the platform E. Mounted on the spindle C is a bracket $C^1$ cooperating with a screwed member $F^1$ which is coupled by a pair of bevel gears $F^2$ to a shaft $F^3$ carrying a finger wheel F. Thus the height of the spindle can be adjusted by rotating the finger wheel F. The weight of the spindle C and the members carried thereby is partially supported by the spring $D^1$ whose upper end abuts directly or indirectly against the spindle C and whose lower end is supported by the sleeve D.

The platform E is carried on the table B by two freely rotatable balls $E^1$ carried in cups $E^2$ situated on either side of the spindle C and by a roller G in the form of a part of a sphere. The roller G is pivotally mounted on a fork-shaped bracket $G^1$ which can be rotated in the member $G^2$ about an axis at right angles to the axis of rotation of the roller G, the member $G^2$ being attached to the platform E. The roller G is provided with an operating handle $G^3$ by movement of which the roller can be caused to roll in any desired direction in order to effect small horizontal adjustments of the spindle C relative to the head rest A.

The platform E is maintained parallel to itself by a linkage system shown more clearly in Figure 2. The triangular member H is pivotally mounted on the free ends of the parallel links $H^1$ and $H^2$ which are pivotally attached to the table B and is at the same time pivotally mounted on the free ends of the parallel links $H^3$ and $H^4$ which are pivotally attached to the platform E.

The illuminating device, which is described below, and the viewing microscope J are carried respectively by the brackets $K^1$ and $J^1$ which are mounted on the spindle C so that they are each freely rotatable thereon. The bracket $K^1$ can be clamped to the spindle C in any chosen position by the screw $L^1$. Similarly the bracket $J^1$ can be clamped to the spindle C by the screw $L^2$. A further screw $L^3$ is provided for locking the two brackets together in any chosen relative position so that they can be rotated as a unit about the spindle C.

The microscope bracket $J^1$ extends outwardly from the spindle C past the illuminating device and then passes vertically up to support the microscope at the level of the object position, the optical axis of the microscope being approximately horizontal. The microscope is of usual construction and is located so that it can be focussed on any desired point of the patient's eye in the object position.

The illumination device comprises a lamp housing $K^2$ directly carried on the bracket $K^1$. The source of light which conveniently comprises an electric bulb $K^3$ is in the lower part of the lamp housing $K^2$ with a condensing lens $K^4$ above it for concentrating the light from the source $K^3$ on the objective lens $K^5$. Above the condensing lens $K^4$ is an aperture M which will be fully described with reference to Figures 4 and 5. The electric leads $K^8$ from the illuminating bulb $K^3$ conveniently pass through the bracket $K^1$ and down through the inner sleeve $D^2$ situated within the spring $D^1$ to an outlet at the bottom of the flange D.

The objective $K^5$, whose function is to focus an image of the aperture M on the chosen point of the patient's eye, is mounted towards the upper end of the illuminating device. Such objective is adjustable vertically, in the direction of its optical axis, by means of a screw mounting diagrammatically indicated at $K^6$.

Supported on the upper end of the illuminating device K above the objective $K^5$ is a small inclined reflector $K^7$ for deflecting the illuminating rays from the objective to the chosen point of the patient's eye. The mounting is such that this reflector lies as close as possible to the microscope J, without in any way fouling the movement of the microscope around the axis of rotation. In practice, this means that the illuminating rays will approach the patient's eye at a small inclination to the horizontal, but the angle can usually be made quite small, so that the advantages of having the axis of illumination coincident with the viewing axis can very nearly be achieved.

In the modified construction shown in Figure 3 the inclined reflector N of the illuminating device is situated on the optical axis of the microscope J between such microscope and the patient's eye. In this case, of course, the reflector N is partially transparent in order to permit the viewing rays to pass to the microscope. This modification permits the axis of illumination to be coincident with the viewing axis, but necessarily involves some loss of light.

Figure 4 illustrates an alternative construction of the illuminating device and together with Figure 5 also serves to show details of the aperture M of Figure 1. In this construction the barrel O of the illuminating device can be rotated about its optical axis relatively to the bracket $K^1$, the aperture M rotating with the barrel. The lamp housing $K^2$ is integral with the barrel O so that the light source $K^3$, which would be pre-set relative to the aperture M to pass the maximum amount of light therethrough, continues to give optimum lighting conditions as the aperture M is rotated. A spring loaded detent $O^3$ mounted on the bracket $K^1$ normally engages a recess $O^4$ in the barrel O. Rotation of the barrel through a small angle will, however, force the detent $O^3$ out of the recess $O^4$ and the barrel can then be rotated without restraint. Connected to the bracket $K^1$ is a vertical pillar P which extends almost to the top of the illuminating device. A latch lever $P^1$ normally engages a slot $O^1$ in the collar $O^2$, which is mounted on the top of the barrel O and is freely rotatable thereon. When the lever $P^1$ is disengaged from the slot $O^1$ the collar $O^2$, which carries the inclined reflector $K^7$, will rotate with the barrel O. When, however, the lever $P^1$ engages the slot $O^1$, the inclined reflector $K^7$ will remain in a fixed position when the barrel O is rotated.

The aperture M is in the form of a slit whose width can be varied in the following manner. The members $M^3$ and $M^4$, whose adjacent surfaces form the sides of the slit, are spring-urged outwardly from each other. Cam surfaces provided on their outer edges cooperate with pins, not shown, on the rotatable collar $M^1$ so that, as the collar $M^1$ is rotated about the barrel O, the width of the slit aperture is varied. Immediately beneath the aperture N is a member $M^5$ which is provided with cam surfaces on its ends cooperating with pins, not shown, on a further collar $M^2$, so that rotation of such collar about the barrel O causes the member $M^5$ to slide across the aperture. This member has three aperture positions $M^6$, $M^7$ and $M^8$ which can be located in turn on the optical axis. The first position $M^6$ offers no obstacle to the passage of light through the main aperture M, whilst the second position $M^7$ and the third position $M^8$ each present a small circular hole, such holes being of different sizes. Thus by operating the two collars $M^1$ and $M^2$ it is possible to provide a slit aperture of variable width or a circular aperture of one or other of two sizes as may be required.

In the normal position as held by the detent $O^3$ the slit aperture lies in such a posiiton that when reflected by the inclined reflector $K^7$ it will focus a vertical slit of light on the chosen part of the patient's eye. By rotating the barrel O with the reflector $K^7$ held stationary the slit of light on the patient's eye can be rotated to the horizontal or any desired angular position. By rotating the barrel and reflector together the slit of light can be traversed across the patient's eye.

It will be understood that the above constructions are given by way of example only and that details may be altered without departing from the scope of the invention.

What we claim as our invention and desire to secure by Letters Patent is:

1. Optical slit lamp apparatus for the examination of the human eye of the type comprising a head rest for locating the eye to be examined at the object position, a microscope for observing the eye so located from different angles of observation with respect thereto and an illuminating means for directing a beam of light on to the object position from different angular directions, characterized by two brackets mounted for pivotal movement around an axis approximately aligned on the object position at approximately right angles to the optical axis of the microscope, one of said brackets supporting the microscope and the other supporting the illuminating means, the illuminating means bracket having a shorter arm than that of the microscope bracket and swinging freely between the latter and its axis of movement in all positions of observation of the microscope to maintain the beam of light directed on the object position, such illuminating means including an aperture member, a source of light for illuminating the aperture of such member, an objective whose optical axis is approximately parallel to the axis of pivotal movement of said brackets for focusing an image of the aperture on the object position, and a small reflector for deflecting the illuminating beam from the objective to the object position, the small reflector lying close to the plane of observation but just clear of the path of movement of the microscope.

2. Optical slit lamp apparatus as claimed in claim 1, in which the aperture member includes an aperture of narrow slit form, and the source of light is set relatively to the slit to give maximum illumination throughout the length of the slit.

3. Optical slit lamp apparatus as claimed in claim 2, having means whereby the aperture member, and the source of light can be rotated about the axis of the illuminating device.

4. Optical slit lamp apparatus as claimed in claim 3, including means whereby the small reflector can be rotated with the aperture member, and means whereby the small reflector can be held against rotation while the aperture member is rotated.

5. Optical slit lamp apparatus as claimed in claim 4, including a detent for holding the aperture member in at least one predetermined position.

6. Optical slit lamp apparatus as claimed in claim 1, having means whereby the aperture member can be rotated about the optical axis of the illuminating device, and a detent for holding such member in at least one predetermined position.

7. Optical slit lamp apparatus as claimed in claim 1, in which the small reflector is in the form of a partially transparent reflector and intercepts the plane of movement of the optical axis of the microscope.

8. Optical slit lamp apparatus as claimed in claim 1, having means whereby the two brackets can be locked together when desired to enable the microscope and the illuminating means to be rotated together as a unit about the axis of rotation.

9. Optical slit lamp apparatus for the examination of the human eye, comprising a support table, a head rest carried by the table for locating the eye to be examined in the object position, a platform movably mounted on the table, means for effecting small adjustments of the position of the platform on the table, means interconnecting the platform and table for maintaining orientation of one with respect to the other during adjustment of the platform, a spindle which is carried by the platform, and whose axis is approximately aligned on the object position, two brackets rotatably mounted on such spindle, a microscope for observing the object position carried by one of such brackets and having its optical axis approximately at right angles to the axis of the spindle, and means carried by the other bracket for illuminating the object position, such illuminating means including an aperture member, a source of light for illuminating the aperture of such member, an objective whose optical axis is approximately parallel to the axis of the spindle for focussing an image of the aperture on the object position, and a small reflector for deflecting the illuminating beam from the objective to the object position, such reflector lying close to the optical axis and just clear of the path of movement of the microscope to pass between the latter and the object position.

10. Optical slit lamp apparatus as claimed in claim 9, having means whereby the spindle can be adjusted in the direction of its axis relatively to the platform.

11. Optical slit lamp apparatus as claimed in claim 9, having a parallel-motion linkage interconnecting the platform and the table.

12. In an ophthalmic apparatus of the character described having a base, a head rest on said base, a pivotally mounted illuminating device and a pivotally mounted observation microscope device adapted for observing the cornea and interior and posterior sections of the eye to be examined, an arm carrying said illuminating device, and another arm carrying said microscope device, both arms being disposed on said base rotatable about a common vertical axis traversing the head rest at the locus at which the pupil of the eye to be examined is to be located, said pivoted illuminating device containing in a vertically arranged housing a light source and optical means comprising lenses and reflecting means for projecting light from said source in substantially horizontal direction onto the eye to be examined, said pivoted microscope having objective and eyepiece lenses, the distance between said locus of observation and said illuminating device being shorter than the distance between said locus and said microscope device, and both said devices being constructed and disposed on the respective arms to obtain sufficient spatial distance between each other in all operative positions of the illuminating device and the microscope device including the special operative position where the illumination and observation directions coincide.

13. Slit lamp apparatus comprising a rest for locating the eye to be examined at the object position, a microscope for observing the object position mounted on a bracket rotatable about a vertical axis approximately aligned on the object position, the optical axis of the microscope being substantially horizontal and passing through the axis of rotation of said bracket, and means for illuminating the object position also rotatable about the axis of rotation of said bracket, the distance between the object position and said illuminating means being shorter than the distance between said object position and said microscope and said microscope and illuminating means each being movable independently of the other without interference through their respective arcs of movement, said illuminating means including an aperture, a source of light for illuminating the aperture, a small reflector which lies close to but just clear of the path of movement of said microscope and an objective cooperating with said reflector to focus an image of said aperture on the object position, the optical axis of said objective being approximately parallel to the axis of rotation of said bracket and said source of light and reflector being adjustable around said axis of rotation to cause the illuminating beam from said objective to be deflected to the object position along an axis which in one position of the illuminating means relatively to the microscope lies at not more than a very slight angle to the optical axis of the microscope, whereby in such position the light rays in said illuminating beam are very nearly coincident with the optical axis of the microscope.

14. In a slit lamp apparatus the combination of a base, means carried by the base for positioning an eye to be examined at the locus of observation, a vertical spindle movably carried by the base, means for adjustably moving the spindle to bring its axis substantially into alignment with a vertical axis passing through the observation locus, a rigid first arm mounted to swing about the spindle, illuminating means carried by said first arm, said illuminating means comprising a light source and optically aligned lens means for projecting light rays from the source in a substantially vertical direction, an inclined reflector positioned in the path of the vertically directed light rays for directing the light rays laterally and onto the eye to be examined, a rigid second arm mounted to swing about the spindle and extending outwardly therefrom beyond the path of movement of the illuminating means and thence upwardly, a microscope carried by the upper part of said second arm for observing the eye to be examined, the distance between the axis of the observation locus and a nearby part of the microscope being greater than the distance between the axis of the observation locus and any adjacent part of the illuminating means lying substantially in the same horizontal plane whereby the microscope and illuminating means may be swung past each other without mutual interference.

15. In an ophthalmic instrument of the type described having a base, a head rest carried by the base for positioning an eye to be examined, a vertical spindle movably carried by the base, means for adjusting the spindle laterally to bring its axis substantially into alignment with a vertical axis traversing the head rest at the observation locus at which the pupil of the eye under examination is to be located, a first bracket mounted to swing about the spindle, illuminating means carried by the bracket and comprising a vertically positioned housing, a light source and lens means within the housing, reflecting means carried at the upper end of the housing in optical alignment with the source and lens means whereby light from the source is directed laterally onto the eye to be examined, a second bracket mounted to swing on said spindle and extending outwardly therefrom beyond the path of movement of the illuminating means, a microscope carried by the second bracket for observing the eye under examination, the respectively adjacent parts of the microscope and illuminating means which lie substantially in the same horizontal plane being spaced apart radially with respect to the axis of said spindle whereby the microscope and illuminating means may be swung past each other without interference.

16. In an opthalmic apparatus of the type described, the combination of a vertical spindle, a first arm mounted to swing about the spindle, illuminating means carried by said first arm for projecting a beam of light into an eye under examination from the front and both sides, said illuminating means comprising an inclined reflector and means associated therewith defining an aperture, means for illuminating the aperture from the side thereof remote from said reflector and lens means positioned between said aperture and reflector coacting therewith, a second arm mounted to swing about said spindle and extending outwardly therefrom beyond the path of movement of the illuminating means, an observation microscope carried by the outwardly extending part of the second arm, said microscope extending laterally adjacent the plane of the reflector and adjustable about said spindle with its optical axis in alinement with the eye under examination, the microscope and illuminating means being spaced apart to permit angular movement past each other from either direction without mutual interference or change of adjustment radially.

References Cited in the file of this patent

UNITED STATES PATENTS

| 1,671,152 | Graves | May 29, 1928 |
| 2,204,014 | Grout | June 11, 1940 |
| 2,235,319 | Jobe | Mar. 18, 1941 |
| 2,257,331 | Clarke | Sept. 20, 1941 |

FOREIGN PATENTS

| 282,187 | Great Britain | Dec. 22, 1927 |
| 423,175 | Great Britain | Jan. 25, 1935 |
| 620,541 | Germany | Oct. 23, 1935 |
| 640,084 | Germany | Dec. 21, 1936 |
| 235,602 | Switzerland | Dec. 15, 1944 |